United States Patent
Kawashima et al.

[11] Patent Number: 5,672,946
[45] Date of Patent: Sep. 30, 1997

[54] CONTROL SYSTEM AND METHOD FOR VEHICLE SPEED-RESPONSE TYPE INTERMITTENT WIPER

[75] Inventors: Naoki Kawashima, Gifu; Yoshihiro Murase, Nagoya; Eri Nishikawa; Tamotsu Kurachi, both of Okazaki, all of Japan

[73] Assignee: Mitsubishi Jidosha Kogyo Kabushiki Kaisha, Tokyo, Japan

[21] Appl. No.: 582,353

[22] Filed: Jan. 19, 1996

[30] Foreign Application Priority Data

Jan. 20, 1995 [JP] Japan ..................................... 7-006840

[51] Int. Cl.⁶ ............................................. H02P 1/04
[52] U.S. Cl. .......................... 318/444; 318/443; 318/483; 15/250.17
[58] Field of Search ...................... 318/443, 444, 318/DIG. 2; 307/9.1, 10.1, 10.8; 15/250.17, 483; 160/11

[56] References Cited

U.S. PATENT DOCUMENTS

| | | | |
|---|---|---|---|
| 4,389,603 | 6/1983 | Kogawa et al. | 318/443 |
| 4,689,535 | 8/1987 | Tsunoda et al. | 318/443 |
| 5,166,587 | 11/1992 | Smart | 318/444 |
| 5,200,676 | 4/1993 | Mueller et al. | 318/444 |

FOREIGN PATENT DOCUMENTS 6344869  12/1994  Japan.

Primary Examiner—Karen Masih

[57] ABSTRACT

This invention relates to a control system and method for a vehicle speed-response type intermittent wiper. An operation time interval for the wiper, which serves to wipe a window of a vehicle, is set in accordance with a speed of the vehicle to drive the wiper at the operation time interval. Upon detection of a start of the vehicle from a stopped state, the wiper is driven in temporary precedence of the wiper operation time interval so that driving of the wiper can be adequately controlled to ensure the provision of a sufficient area of vision without driving the wiper beyond necessity.

11 Claims, 5 Drawing Sheets

CONTROL SYSTEM AND METHOD FOR VEHICLE SPEED-RESPONSE TYPE INTERMITTENT WIPER

BACKGROUND OF THE INVENTION a) Field of the Invention

This invention relates to a control system and method for driving a wiper in an automotive vehicle or the like, and specifically to a control system and method for a vehicle speed-response type intermittent wiper in which the wiper is intermittently driven at intervals corresponding to a vehicle speed.

b) Description of the Related Art

In order to avoid drive of wipers beyond necessity, automotive vehicles were equipped with a vehicle speed-response type intermittent wiper control system to intermittently drive the wipers at an interval corresponding to a vehicle speed. This control system is constructed as schematically illustrated in FIG. 4 to FIG. 6.

Referring first to FIG. 4, an intermittent time interval setting knob 101 is provided. A driver of the vehicle turns a left-end turnable portion 101A to register a setting point 101B with a desired one of graduations to set the intermittent characteristic.

The graduations of the intermittent time interval setting knob 101 correspond to individual characteristics of a map shown in FIG. 6, whereby setting of an intermittent time interval for the wipers is effected in accordance with the map selected or set through the intermittent time interval setting knob 101. This map has been prepared to give a linearly-interpolated value even when the setting point 101B of the turnable knob portion 101A indicates a position between mutually-adjacent two of the graduations.

Here, the vehicle speed which serves as a basis for the control is detected by sensing a rotational speed, for example, by a vehicle speed sensor mounted on an output shaft of a transmission. The vehicle speed sensor is designed to output four signal pulses per full rotation of a tire and to calculate the vehicle speed on the basis of the number of signal pulses during preceding one second.

Further, each characteristic is set in logarithmic proportion to an intermittent time interval setting volume and in relation to a vehicle speed, is set depending on the density of raindrops adhered on the window.

Owing to the construction as described above, an intermittent time interval T is set corresponding to a vehicle speed and as shown in FIG. 5. This intermittent time interval T is changed as driving proceeds, that is, as the vehicle speed varies.

In such a conventional vehicle speed-response type intermittent wiper control system, however no determination is made with respect to a start. Where the intermittent time interval is set at a rather long interval by the driver in a light rain or the like, coupled with the fact that the vehicle speed is 0 before a start, the wipers will not be driven until the predetermined intermittent time interval is reached after a start upon making the start at an intersection. This means that the vehicle will run with substantial raindrops adhered on a windshield.

Needless to say, it is necessary to secure a sufficient area of vision when making a start at an intersection or the like. Running under such conditions as described above is therefore not desirable. An improvement is hence desired for higher safety in driving.

SUMMARY OF THE INVENTION

With the foregoing in view, the present invention has as a primary object the provision of a control system and control method for a vehicle speed-response type intermittent wiper, which make it possible to ensure the provision of a sufficient area of vision by adequately controlling drives of the wiper without driving the wiper beyond necessity.

In one aspect of the present invention, there is thus provided a control system for a vehicle speed-response type intermittent wiper, comprising: wiper drive means for driving said wiper for wiping a window of a vehicle; vehicle speed detection means for detecting a vehicle speed; intermittent wiper operation time setting means for setting an intermittent time interval of operation of said wiper in accordance with the vehicle speed detected by said vehicle speed detection means; first control means for outputting a control signal to said wiper drive means to drive said wiper at the wiper operation time interval set by said intermittent wiper operation time setting means; vehicle start detection means for detecting that said vehicle has started running from a stopped state; and second control means for outputting a control signal to said wiper drive means to drive said wiper in temporary precedence of control by said first control means upon detection of a start of said vehicle by said vehicle start detection means under the control by said first control means.

According to the vehicle speed-response type intermittent wiper control system of the present invention, upon driving the wiper by said wiper drive means to wipe a window of the vehicle, a wiper operation time interval is set by said intermittent wiper operation time interval setting means in accordance with a vehicle speed detected by said vehicle speed detection means, and control signals are outputted at the thus-set wiper operation time interval from said first control means to said wiper drive means to drive the wiper. However, upon detection of a start of said vehicle by said vehicle start detection means under control by said first control means, a control signal is outputted from said second control means to said wiper drive means to drive said wiper in temporary precedence of the control by said first control means.

The vehicle speed-response type intermittent wiper control system according to the present invention can therefore bring about effects or merits as will be described next.

It is possible to ensure the provision of a sufficient area of vision by performing appropriate removal of raindrops upon starting the vehicle or the like at an intersection while achieving the object of the vehicle speed-response type intermittent wiper that the wiper is prevented from being driven beyond necessity. This meritoriously contributes to safe driving.

Since a calculated vehicle speed tends to fall behind, in other words, to be lagged relative to a corresponding actual vehicle speed at the time of a start, the wiper may not be driven at an intermittent time interval corresponding to the actual vehicle speed. It is however still possible to drive the wiper at an appropriate intermittent time interval, thereby meritoriously contributing to safe driving.

Further, said vehicle start detection means may be constructed to detect the start of said vehicle from the stopped state on the basis of vehicle speeds detected at two different time points, respectively, by said vehicle speed detection means. This feature can bring about an effect or merit as will be described next.

As a vehicle speed employed for control, an average value of vehicle speeds at predetermined moments in the past is often used in general. Such an approach cannot adequately reflect the state of an acceleration at a start so that control of wiper drive tends to be lagged. Successive monitoring of vehicle speeds at two time points however makes it possible to precisely reflect the state of an acceleration at a start, thereby bringing about the merit that intermittent drive of the wiper can be appropriately performed.

In addition, said second control means may comprise determination means for determining, upon detection of the start of said vehicle by said vehicle start detection means under the control by said first control means, whether a predetermined time has elapsed from a time point of immediately preceding control by said first control means; wiper drive control signal output means for outputting a control signal to said wiper drive means to drive said wiper when it is determined by said determination means that the predetermined time has elapsed from the immediately preceding control by said first control means; and inhibition means for inhibiting the control by said second control means when it is determined by said determination means that the predetermined time has not elapsed from the immediately preceding control by said first control means. This construction makes it possible to perform the control of the vehicle speed-response type intermittent wiper depending not only on a vehicle speed but also on a condition in absolute time, thereby bringing about the merit that any insufficiency in driving the wiper during an acceleration at a start of the vehicle can be supplemented and also the merit that any excessive drive of the wiper can be inhibited to avoid deterioration of the wiper.

Moreover, said intermittent wiper operation time setting means may be provided with a map in which plural different wiper operation time interval characteristics are stored, so that the intermittent wiper operation time is set in accordance with one of the wiper operation time interval characteristics of said map, which is selected by a driver, in addition to the vehicle speed. According to this, the wiper is intermittently operated in accordance with a vehicle speed and the driver's intention during a usual time.

Said vehicle speed detection means may be constructed to detect a vehicle speed on the basis of a rotational speed of an output shaft of a transmission. This has the merit that a vehicle speed can be accurately detected.

Said vehicle start detection means may be constructed to determine a start of said vehicle when said vehicle is detected to be running at a predetermined speed lower at a detection time point on the basis of information from said vehicle speed detection means and further when the vehicle speed is detected to have become higher than the predetermined speed at another detection time point immediately after the former detection time point. This permits easy and accurate detection of a vehicle speed.

In another aspect of the present invention, there is also provided a control method for a vehicle speed-response type intermittent wiper, said method including setting an operation time interval for said wiper, which serves to wipe a window of a vehicle, in accordance with a speed of said vehicle to drive said wiper at the operation time interval, which comprises detecting a start of said vehicle from a stopped state and, upon detection of the start of said vehicle from the stopped state, driving said wiper in temporary precedence of the wiper operation time interval.

The vehicle speed-response type intermittent wiper control method according to the present invention can therefore bring about effects or merits as will be described next.

It is possible to ensure the provision of a sufficient area of vision by performing appropriate removal of raindrops upon making a start or the like at an intersection while achieving the object of the vehicle speed-response type intermittent wiper that the wiper is prevented from being driven beyond necessity. This meritoriously contributes to safe driving.

Since a calculated vehicle speed tends to fall behind, in other words, to be lagged relative to a corresponding actual vehicle speed at the time of a start, the wiper may not be driven at an intermittent time interval corresponding to the actual vehicle speed. It is, however, still possible to drive the wiper at an appropriate intermittent time interval, thereby meritoriously contributing safe running.

Further, said vehicle can be determined to have started on the basis of information on speeds of said vehicle at two different time points. This makes it possible to precisely reflect the state of an acceleration at a start, thereby bringing about the merit that intermittent drive of the wiper can be appropriately performed.

In addition, upon detection of a start of said vehicle while said wiper is being driven at said wiper operation time interval, said control method may further comprise determining whether a predetermined time has elapsed from an immediately preceding wiper control time point; and driving said wiper when the predetermined time is determined to have elapsed from the immediately preceding wiper control time point but inhibiting operation of said wiper immediately after the start of said vehicle when the predetermined time is not determined to have elapsed from the immediately preceding wiper control time point. This makes it possible to perform the control of the vehicle speed-response type intermittent wiper depending not only on a vehicle speed but also on a condition in absolute time, thereby bringing about the merit that any insufficiency in driving the wiper during an acceleration at a start can be supplemented and also the merit that any excessive drive of the wiper can be inhibited to avoid deterioration of the wiper.

DESCRIPTION OF THE PREFERRED EMBODIMENTS

Figure 1:
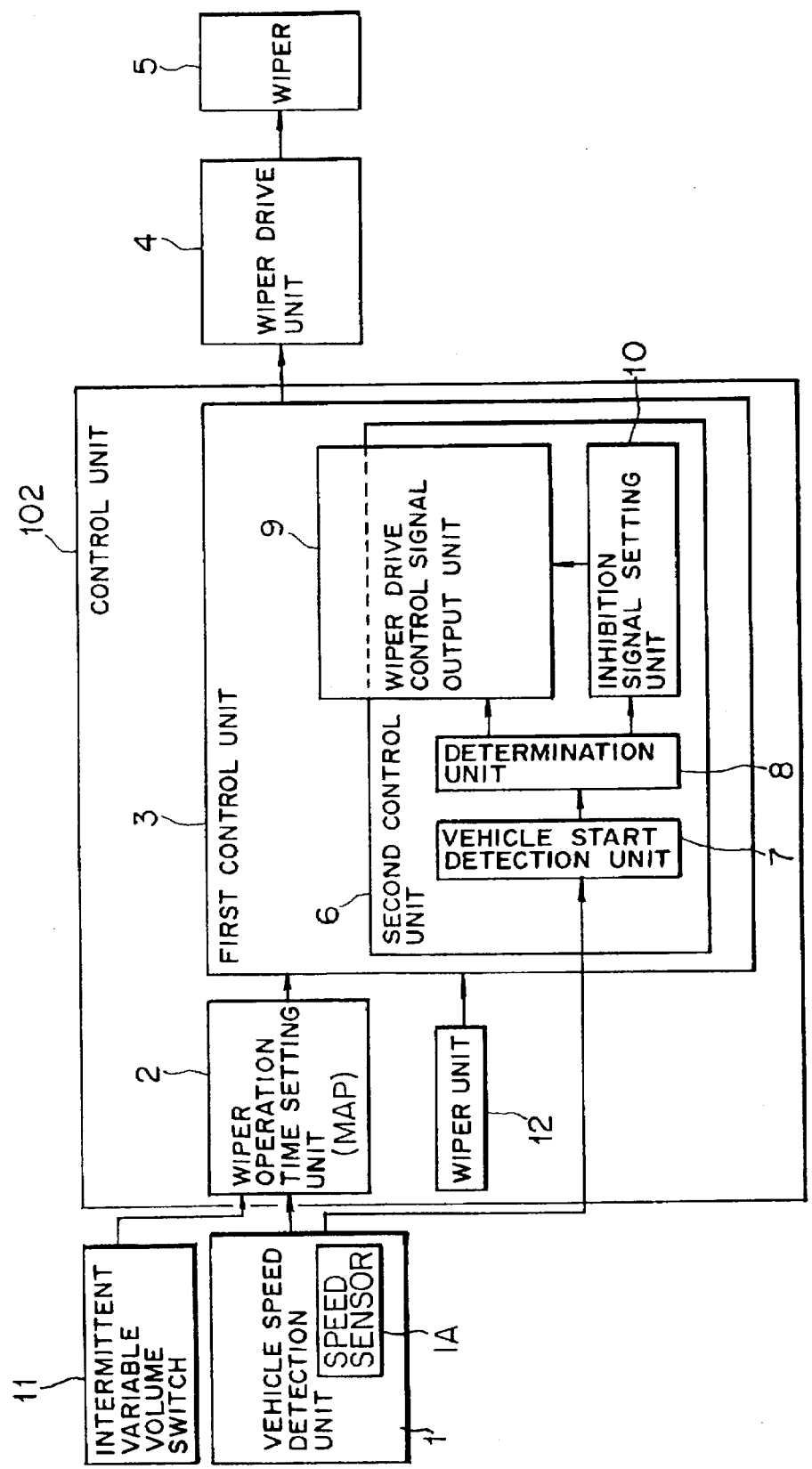
FIG. 1 is a control block diagram showing an essential part of a vehicle speed-responsive type intermittent wiper control system according to an embodiment of the present invention.
Figure 2:
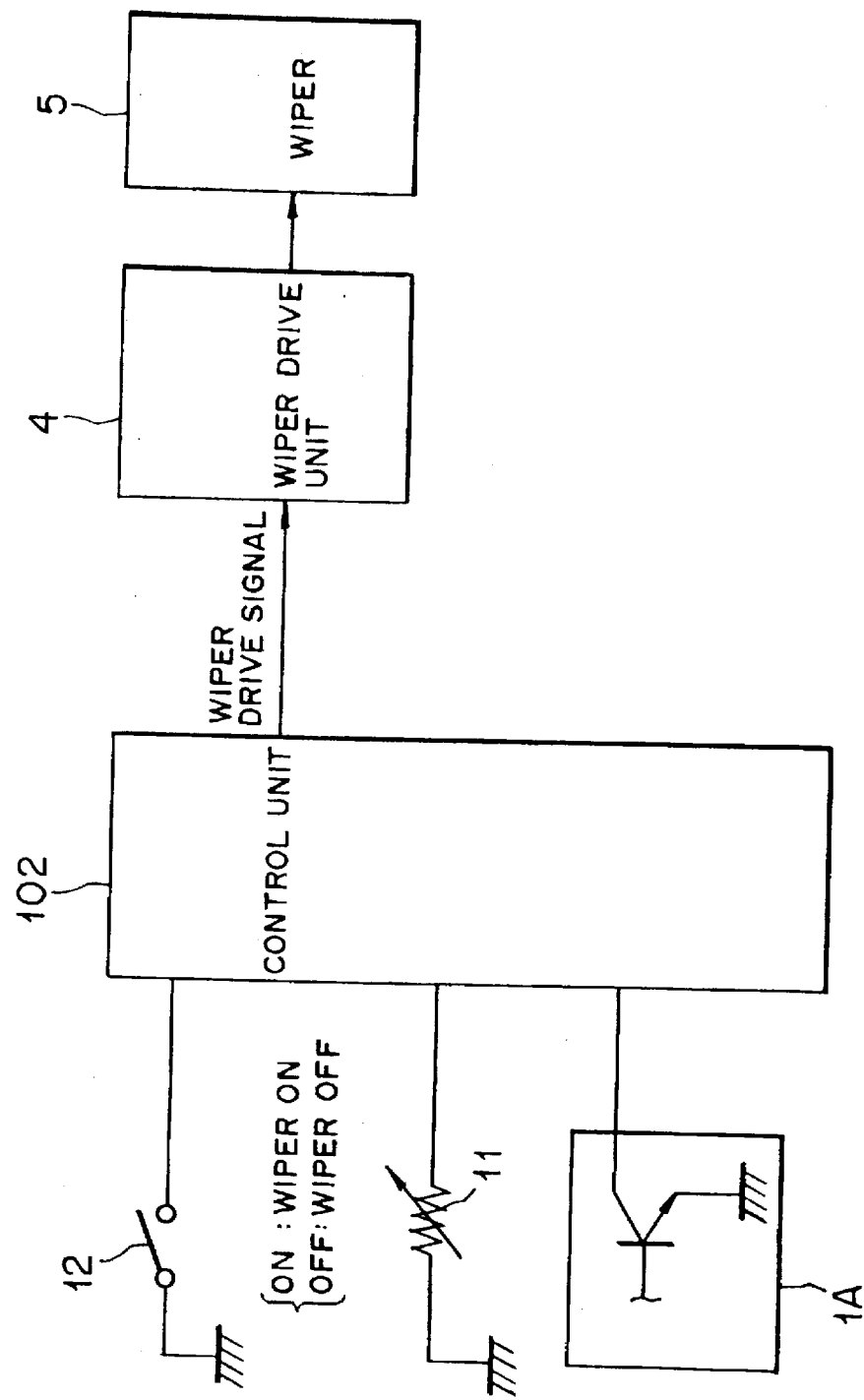
FIG. 2 is a schematic block diagram showing a hardware construction of the essential part of the vehicle speed-responsive type intermittent wiper control system according to the embodiment of the present invention.

With reference to the accompanying drawings, the vehicle speed-responsive type intermittent wiper control system according to a preferred embodiment of the present invention will be described hereinafter. As is shown in FIG. 1 and FIG. 2, a vehicle is provided with a wiper drive unit 4, as wiper drive means, for driving a wiper 5 to wipe a window, and a vehicle speed detection unit 1, as a vehicle speed detection means, for detecting a vehicle speed.

The vehicle speed detection unit 1 is designed to detect a vehicle speed by sensing a revolution speed with a speed sensor 1A mounted on an output shaft of a transmission. It is designed to output four signal pulses per full rotation of a tire and to calculate the vehicle speed on the basis of the number of signal pulses during preceding one second.

Figure 6:
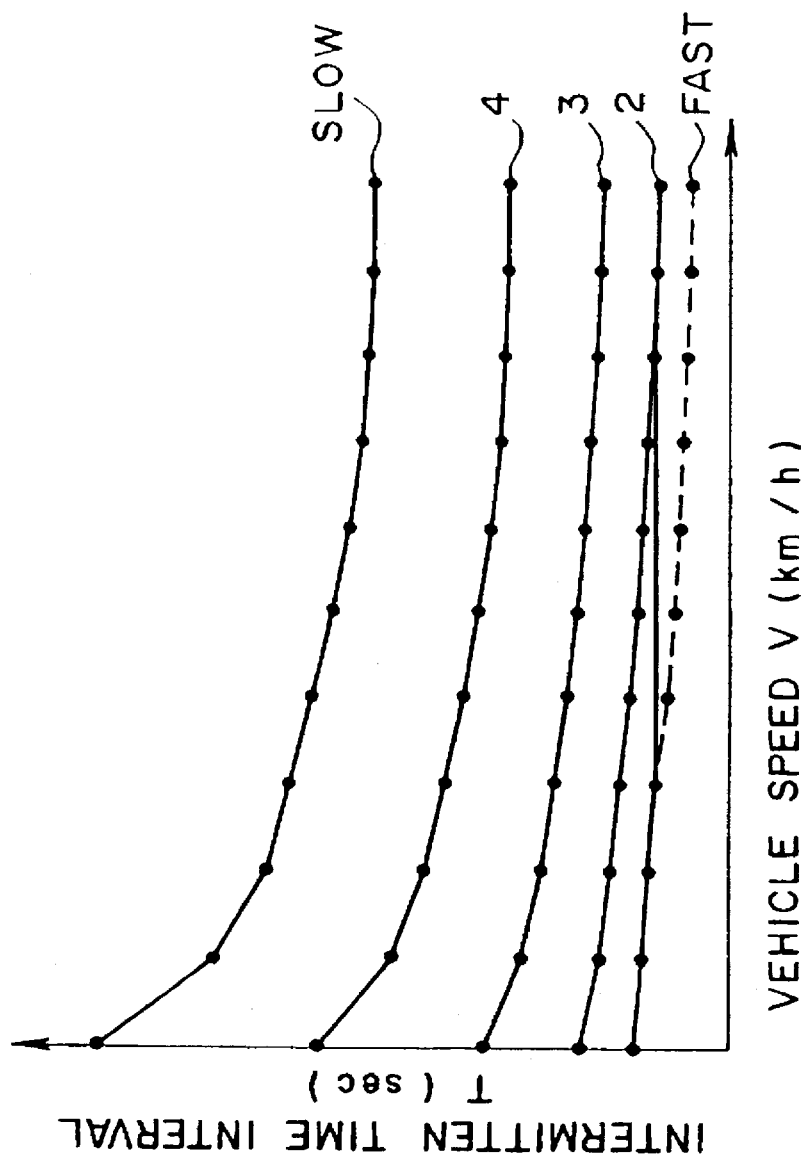
FIG. 6 is a graph illustrating an intermittent time interval setting map in the vehicle speed-response type intermittent wiper control system in the conventional vehicle.

Arranged in a control unit 102 is an intermittent wiper operation time setting unit 2, as intermittent wiper operation time interval setting means, for setting an intermittent wiper operation time interval in accordance with the vehicle speed detected at the vehicle speed detection unit 1. The intermittent wiper operation time setting unit 2, designed to set an intermittent time interval T on the basis of a characteristic selected or set by a driver and the vehicle speed while using the map which is shown in FIG. 6, is stored in the control unit 102 and is similar to conventional maps.

Figure 4:
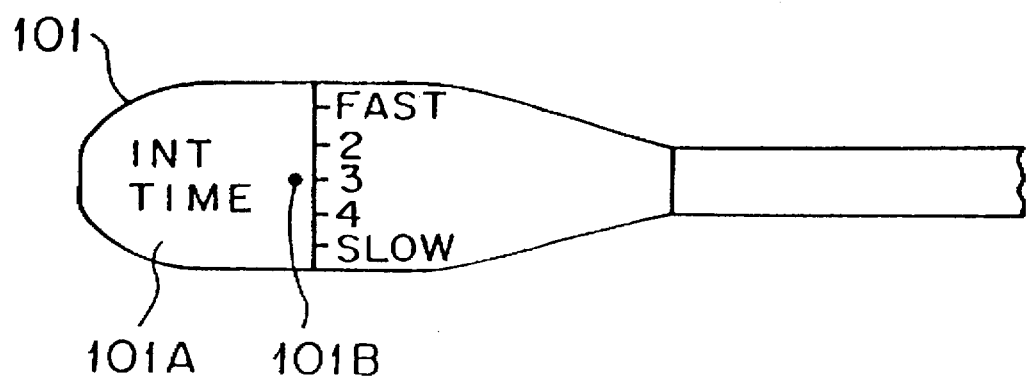
FIG. 4 is a schematic front view illustrating a intermittent time interval setting knob in a vehicle speed-response type intermittent wiper control system in a conventional vehicle.
Figure 5:
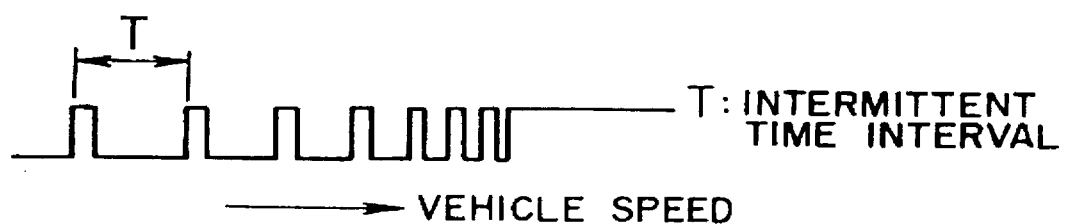
FIG. 5 is a graph showing a state of operation in the vehicle speed-response type intermittent wiper control system in the conventional vehicle.

Incidentally, the wiper operation time setting characteristics are designed to permit full adjustments of their gains by an intermittent variable volume switch 11 which corresponds to the intermittent time interval setting knob 101 depicted in FIG. 4. Fine adjustments of the wiper operation time setting characteristics are therefore possible upon setting the control system.

Also arranged in the control unit 102 is a first control unit 3, as first control means, for outputting a control signal at a wiper operation time interval T, which has been set by the intermittent wiper operation time setting means 2, to the wiper drive unit 4 to drive the wiper.

Further, the first control unit 3 is internally provided with a vehicle start detection unit 7, as vehicle start detection means, for detecting a start of the vehicle from a stopped state and also with a second control unit 6, as second control means, for outputting a control signal to the wiper drive unit 4 to drive the wiper 5 in temporary precedence of control by the first control unit 3 upon detection of a start of the vehicle at the vehicle start detection unit 7. Under an operation pursuant to the flow chart of FIG. 3, control by the second control unit 6 is performed as determined beforehand.

Figure 3:
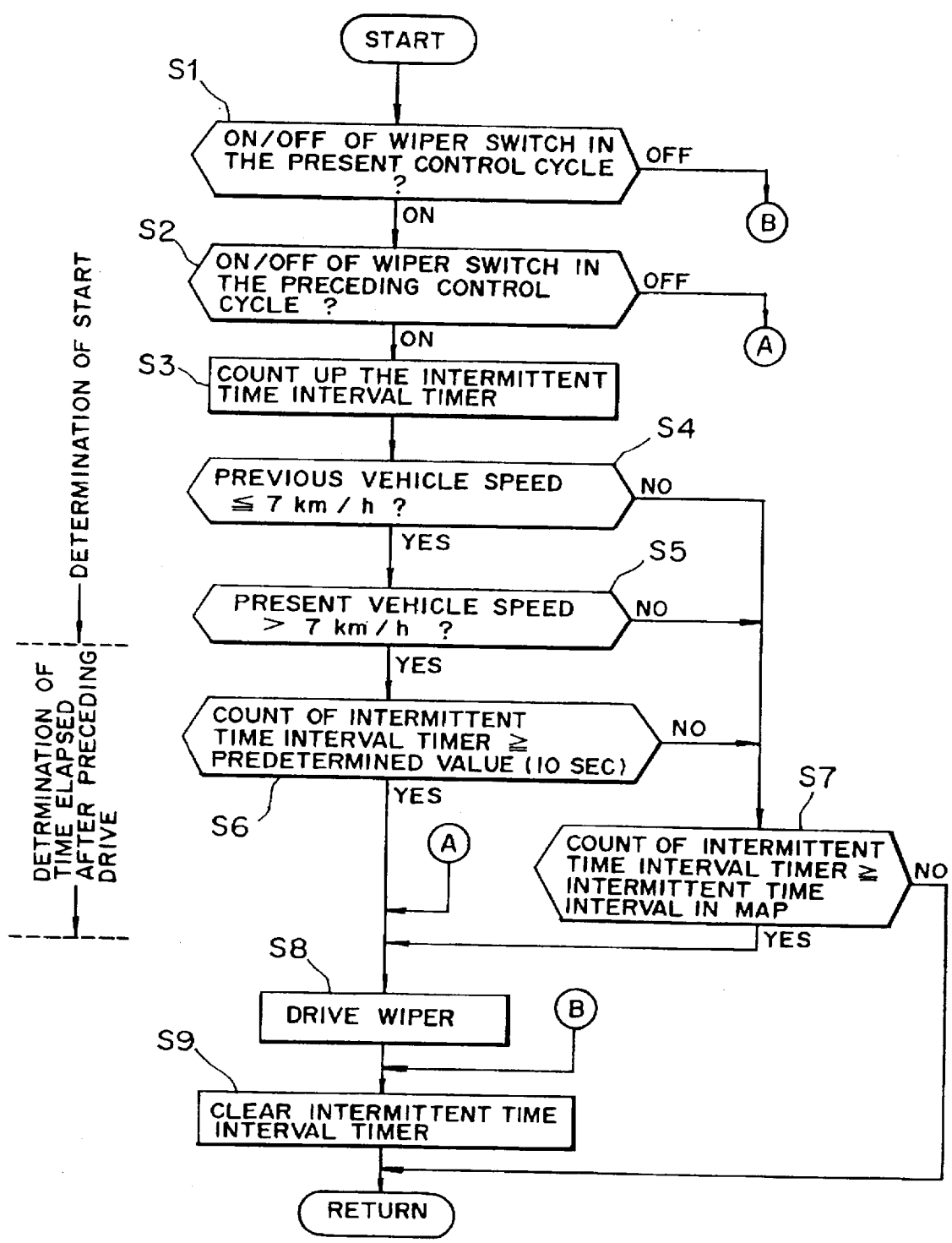
FIG. 3 is a flow chart showing operation in the essential part of the vehicle speed-responsive type intermittent wiper control system according to the embodiment of the present invention.

The vehicle start detection unit 7 is designed to detect by an operation pursuant to the flow chart of FIG. 3, namely, from vehicle speeds detected at different time points by the vehicle speed detection unit 1 that the vehicle has started running from a stopped state.

Further, the second control unit 6 is provided with a determination unit 8, as determination means, for determining, upon detection of a start of the vehicle by the vehicle start detection unit 7 under control by the first control unit 3, whether a predetermined time Tc (for example, 10 seconds) has elapsed from a time point of immediately preceding control by the first control unit 3.

In addition, the second control unit 6 is also provided with a wiper drive control signal output unit 9, as wiper drive signal output means, for outputting a control signal to the wiper drive unit 4 to drive the wiper 5 upon determination by the determination unit 8 that the predetermined time Tc has elapsed from a time point of immediately preceding control by the first control unit 3 and also with an inhibition signal setting unit 10, as inhibition means, for setting a signal to inhibit the control by the second control unit 6 upon determination by the determination unit 8 that the predetermined time Tc has not elapsed from the time point of the immediately preceding control by the first control unit 3. By operations pursuant to the flow chart of FIG. 3, the wiper drive control signal output unit 9 and the inhibition signal setting unit 10 can perform desired functions, respectively.

Incidentally, on/off control of the wiper 5 is performed by turning on or off a wiper switch 12. During intermittent drive of the wiper, the wiper switch 12 is also kept on.

As the present invention is constructed as described above, desired control operation is performed, for example, in accordance with the flow chart of FIG. 3. The operation of this flow chart is repeatedly performed at a predetermined computing cycle.

First, it is determined in step S1 whether the wiper switch 12 is on or off with respect to the present control cycle. Next, in step S2, it is determined whether the wiper switch 12 was on or off with respect to the preceding control cycle.

Taking of an "ON" route after step S1 or step S2 is to continuously drive the wiper. In this case, processing of step S3 onwards will be performed to control the wiper.

On the other hand, taking of an "OFF" route after step S1 is to prevent driving of the wiper. In this case, clearing of an intermittent time interval timer in step S9 is performed without allowing to perform various control operations.

Further, when an "OFF" route is taken after step S2, the routine jumps to step S8 to immediately drive the wiper 5 because it is immediately after the wiper switch 12 has been turned on.

In step S3, the intermittent time interval timer is counted up in preparation for determination of intermittent time intervals in step S6 and step S7.

It is then determined in step S4 whether the vehicle speed was not higher than, for example, 7 km/hr with respect to the preceding control cycle, followed by the determination in step S5 as to whether the vehicle speed has exceeded 7 km/hr with respect to the present control cycle.

Here, the value of 7 km/hr as a vehicle speed is a value for detecting that the driver has showed clear intention to make a start. Further, during running with a creep surge of an AT vehicle (an automatic-transmission-equipped vehicle) due to a traffic jam or the like, the vehicle speed does not become higher than 7 km/hr. The adoption of 7 km/hr is therefore to avoid determining such running with a creep surge to be a start of the vehicle.

Taking the "YES" route after step S4 or step S5 therefore means that the vehicle has changed from a stopped state to a started state. In this case, start-time control is performed.

It is first determined in step S6 whether the count value of the intermittent time interval timer has reached at least a predetermined value (which corresponds to the above-described predetermined time Tc and may be set, for example, at the time of 10 seconds as described above). If so, it is meant that at least 10 seconds have elapsed since the preceding drive of the wiper. Assuming that running with the wiper stopped further would no longer be possible to ensure the provision of a sufficient area of vision, drive of the wiper in step S8 is performed.

On the other hand, a count value of the intermittent time interval counter smaller than the predetermined value (10 seconds) means that 10 seconds have not elapsed since the preceding drive of the wiper. Assuming that further running of the vehicle with the wiper kept stopped would still ensure the provision of a sufficient area of vision, the control by the second control unit 8 in step S8 is inhibited and the routine advances through a "NO" route to perform step S7.

As has been described above, operation of the inhibition signal setting unit 10 is performed in step S6.

In step S7, the intermittent time interval T in the first control unit 3 is compared with a count value of the intermittent time interval counter in the present control cycle, thereby determining whether the time interval from the preceding drive of the wiper has not reached the wiper drive time interval set by the first control unit 3.

If the count value of the intermittent time interval time in the present control cycle has reached at least the intermittent time interval T in the first control unit 3, the routine advances through a "YES" route to perform step S8 so that the wiper is driven.

This makes it possible to perform drive of the wiper without any problem even if an intermittent time interval T shorter than the predetermined value (10 seconds) of the second control unit 6 is set at the first control unit 3.

Where the count value of the intermittent time interval timer in the present control cycle has not reached the intermittent time interval T, the routine advances through a "NO" route to return because at the first control unit 8, the count value has not reached the time for driving the wiper either.

Incidentally, during running of the vehicle (i.e., under the condition that the vehicle speed is higher than 7 km/hr), the routine advances to step S7 through the "NO" route after step S4 so that determination of wiper drive by the first control unit 3 is performed. The conventional wiper control is therefore performed without any problem.

Where the vehicle remains in a stopped state, in other words, where the vehicle speed remains below 7 km/hr, the routine advances to step S7 through the "NO" route after step S5 and, subsequent to determination of wiper drive by the first control unit 3, returns.

As has been described above, the wiper 5 is driven at the time of a start irrespective of a value of the intermittent time interval map if at least the predetermined time (10 seconds) has elapsed since the preceding drive of the wiper. Removal of raindrops can therefore be effected adequately, thereby ensuring the provision of a sufficient area of vision at the time of the start.

During times other than a starting time, the conventional wiper control by the first control unit 3 is performed without any problem.

Subsequent to drive of the wiper, the intermittent time interval timer is cleared in step S9 in preparation for the next control no matter whether the drive of the wiper was conducted by the first control unit 3 or by the second control unit 6.

According to the present embodiment, the following effects or merits can therefore be obtained.

(1) It is possible to ensure the provision of a sufficient area of vision by performing appropriate removal of raindrops upon making a start or the like at an intersection while achieving the object of the vehicle speed-response type intermittent wiper that the wiper 5 is prevented from being driven beyond necessity. This contributes to safe driving.

(2) Since a calculated vehicle speed tends to fall behind, in other words, to be lagged relative to a corresponding actual vehicle speed at the time of a start, the wiper may not be driven at an intermittent time interval corresponding to the actual vehicle speed. It is however still possible to drive the wiper at an appropriate intermittent time interval, thereby contributing to safe driving.

(3) As a vehicle speed employed for control, an average value of vehicle speeds at predetermined moments in the past is often used in general. Such an approach cannot adequately reflect the state of an acceleration at a start so that control of wiper drive tends to be lagged. Successive monitoring of vehicle speeds at two time points however makes it possible to precisely reflect the state of an acceleration at a start and to perform appropriate intermittent drive of the wiper.

(4) Control of the vehicle speed-response type intermittent wiper is performed depending not only on a vehicle speed but also on a condition in absolute time. This makes it possible to supplement any insufficiency in driving the wiper during an acceleration at a start and also to inhibit any excessive drive of the wiper for the prevention of deterioration of the wiper.

(5) Intermittent time interval characteristics are set, as shown in FIG. 6, in logarithmic proportion to intermittent time interval setting volumes and in relation to vehicle speeds, are set depending on densities of raindrops adhered on a window. At low speeds (about 20 km/hr and lower), the intermittent time interval varies substantially so that the control tends to be lagged during an acceleration at a start. According to the present invention, however, it is controlled to drive the wiper 5 at the time of a start irrespective of the value of the intermittent time interval map if a predetermined time (for example, an intermittent time interval of 10 seconds corresponding to the vehicle speed of 20 km/hr) has elapsed since the preceding drive of the wiper. Effective drive of the wiper is therefore performed.

We claim:

1. A control system for a vehicle speed-response type intermittent wiper, comprising:

wiper drive means for driving said wiper for wiping a window of a vehicle;

vehicle speed detection means for detecting a vehicle speed;

intermittent wiper operation time setting means for setting an intermittent time interval of operation of said wiper in accordance with the vehicle speed detected by said vehicle speed detection means;

first control means for outputting a control signal to said wiper drive means, said first control means controlling said wiper drive means to drive said wiper at the wiper operation time interval set by said intermittent wiper operation time setting means;

vehicle start detection means for detecting that said vehicle has started running from a stopped state; and second control means for outputting a control signal to said wiper drive means, said second control means controlling said wiper drive means to drive said wiper in temporary precedence of the control of said wiper drive means by said first control means upon detection of a start of said vehicle by said vehicle start detection means under the control by said first control means.

2. The control system according to claim 1, wherein said vehicle start detection means detects the start of said vehicle from the stopped state on the basis of vehicle speeds detected at two different time points, respectively, by said vehicle speed detection means.

3. The control system according to claim 1, wherein said second control means comprises, determination means for determining, upon detection of the start of said vehicle by said vehicle start detection means under the control by said first control means, whether a predetermined time has elapsed from a time point of immediately preceding control by said first control means, wiper drive control signal output means for outputting a control signal to said wiper drive means to drive said wiper when it is determined by said determination means that the predetermined time has elapsed from the immediately preceding control by said first control means, and inhibition means for inhibiting the control by said second control means when it is determined by said determination means that the predetermined time has not elapsed from the immediately preceding control by said first control means.

4. The control system according to claim 1, wherein said intermittent wiper operation time setting means is provided with a map in which plural different wiper operation time interval characteristics are stored, so that the intermittent wiper operation time is set in accordance with one of the wiper operation time interval characteristics of said map, which is selected by a driver, in addition to the vehicle speed.

5. The control system according to claim 1, wherein said vehicle speed detection means detects a vehicle speed on the basis of a rotational speed of an output shaft of a transmission.

6. The control system according to claim 2, wherein said vehicle start detection means determines a start of said vehicle when said vehicle is detected to be running at a predetermined speed or lower at a detection time point on the basis of information from said vehicle speed detection means and further when the vehicle speed is detected to have become higher than the predetermined speed at another detection time point immediately after the former detection time point.

7. A control method for a vehicle speed-response type intermittent wiper, comprising:

setting an operation time interval for said wiper, which serves to wipe a window of a vehicle, in accordance with a speed of said vehicle to drive said wiper at the operation time interval;

detecting a start of said vehicle from a stopped state; and driving said wiper in temporary precedence of the operation time interval when the start of said vehicle from the stopped state is detected.

8. The control method according to claim 7, wherein said vehicle is determined to have started on the basis of information on speeds of said vehicle at two different time points.

9. The control method according to claim 7, wherein said driving step comprises, determining whether a predetermined time has elapsed from an immediately preceding wiper control time point, and driving said wiper when the predetermined time is determined to have elapsed from the immediately preceding wiper control time point but inhibiting operation of said wiper immediately after the start of said vehicle when the predetermined time is not determined to have elapsed from the immediately preceding wiper control time point.

10. A control system for a vehicle speed-response type intermittent wiper, comprising:

wiper drive means for driving said wiper for wiping a window of a vehicle;

vehicle speed detection means for detecting a vehicle speed;

intermittent wiper operation time setting means for setting an intermittent time interval of operation of said wiper in accordance with the vehicle speed detected by said vehicle speed detection means;

first control means for outputting a control signal to said wiper drive means, said first control means controlling said wiper drive means to drive said wiper at the wiper operation time interval set by said intermittent wiper operation time setting means;

vehicle start detection means for detecting that said vehicle has started running from a stopped state based on vehicle speed detected at two different time points, respectively, by said vehicle speed detection means; and second control means for outputting a control signal to said wiper drive means, said second control means controlling said wiper drive means to drive said wiper in temporary precedence of the control of said wiper drive means by said first control means upon detection of a start of said vehicle by said vehicle start detection means under the control by said first control means.

11. A control method for a vehicle speed-response type intermittent wiper, comprising:

setting an operation time for said wiper, which serves to wipe a window of a vehicle, in accordance with a speed of said vehicle to drive said wiper at the operation time interval;

detecting a start of said vehicle from a stopped state based on information on speeds of said vehicle at two different time points; and driving said wiper in temporary precedence of the operation time interval when the start of said vehicle from the stopped state is detected.

* * * * *